United States Patent
Oikawa

(10) Patent No.: US 8,094,240 B2
(45) Date of Patent: Jan. 10, 2012

(54) TELEVISION RECEIVER, IMAGE PROCESSING DEVICE, AND HIGH-QUALITY IMAGE DISPLAY SYSTEM

(75) Inventor: Hideki Oikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1375 days.

(21) Appl. No.: 11/702,114

(22) Filed: Feb. 5, 2007

(65) Prior Publication Data
US 2007/0222896 A1 Sep. 27, 2007

(30) Foreign Application Priority Data

Mar. 23, 2006 (JP) ................................ 2006-081355

(51) Int. Cl.
*H04N 5/44* (2011.01)
(52) U.S. Cl. .......................... 348/725; 348/553; 348/571
(58) Field of Classification Search .................. 348/553, 348/571, 725, 734; 725/38
See application file for complete search history.

(56) References Cited

U.S. PATENT DOCUMENTS

| | | | |
|---|---|---|---|
| 7,649,949 B2 * | 1/2010 | Williams et al. | 375/259 |
| 2004/0239816 A1 | 12/2004 | Ando | |
| 2005/0259948 A1 * | 11/2005 | Ando | 386/46 |

FOREIGN PATENT DOCUMENTS

| | | |
|---|---|---|
| JP | A-2002-204465 | 7/2002 |
| JP | A-2004-357029 | 12/2004 |

* cited by examiner

*Primary Examiner* — Jefferey Harold
*Assistant Examiner* — Humam Satti
(74) *Attorney, Agent, or Firm* — Oliff & Berridge, PLC

(57) ABSTRACT

A television receiver transmits channel information obtained based on a remote control signal from a television remote controller to an image processing device through an HDMI interface section. The image processing device receives the channel information through the HDMI interface section, subjects an image signal obtained from a television broadcasting radio wave corresponding to the channel information to high-quality image processing performed in a high-quality image processing section, and transmits the processed image signal to the television receiver through the HDMI interface section. The television receiver receives high-quality image data through the HDMI interface section, and displays a high-quality image expressed by the high-quality image data on an image display section.

1 Claim, 6 Drawing Sheets

TELEVISION RECEIVER, IMAGE PROCESSING DEVICE, AND HIGH-QUALITY IMAGE DISPLAY SYSTEM

Japanese Patent Application No. 2006-81355, filed on Mar. 23, 2006, is hereby incorporated by reference in its entirety.

BACKGROUND OF THE INVENTION

The present invention relates to technology of causing a television receiver to display a high-quality image by connecting an image processing device with the television receiver through a communication channel. In particular, the invention relates to technology suitably used when a communication channel interface is a high-definition multimedia interface (HDMI). The term "image processing device" used herein refers to a device which subjects an image signal obtained by a tuner to high-quality image processing.

An increase in the definition of an image displayed on an existing television receiver has been demanded. To deal with this demand, an image processing device has been studied which is connected to an external input of a television receiver through a cable to allow a high-quality image to be displayed on the display screen of the television receiver.

When connecting the image processing device to the external input of the television receiver and displaying a high-quality image from the image processing device on the display screen of the television receiver, it is necessary for the user to switch the display screen of the television receiver to an external input screen. When changing the program or adjusting the image quality (e.g. brightness, contrast, color depth, or hue) of the high-quality image displayed on the display screen, it is necessary to change the channel or adjust the image quality of the image processing device.

Therefore, when causing the television receiver to display the high-quality image by remote control, it is necessary to supply power to the television receiver using a remote controller for the television receiver (hereinafter called "television remote controller"), switch the display screen to the external input screen, and change the channel of the image processing device using a dedicated remote controller for the image processing device (hereinafter called "dedicated remote controller"). Specifically, the user must selectively operate the television remote controller and the dedicated remote controller when viewing television broadcasting.

SUMMARY

According to a first aspect of the invention, there is provided a television receiver to which an image processing device can be connected through a predetermined communication channel, the television receiver comprising:

an operation signal reception section which receives an operation signal transmitted from a remote control section;

a first tuner unit which receives television broadcasting on a desired channel based on indication information obtained from the operation signal and acquires an image signal corresponding to the broadcasting;

an image processing section which subjects the image signal acquired by the first tuner unit to predetermined image processing and outputs the processed image signal;

an image display section which displays an image based on the image signal output from the image processing section;

a communication channel interface section which transfers information between the television receiver and the image processing device when the image processing device has been connected to the television receiver through the communication channel;

an image processing device detection section which detects whether or not the image processing device connected to the television receiver is in operation, through the communication channel interface section and outputs the detection result;

an indication information transmission section which transmits the indication information obtained from the operation signal to a second tuner unit provided in the image processing device instead of the first tuner unit through the communication channel interface section, based on the detection result when the image processing device is in operation; and a display image switch section which supplies a high-quality image signal from a high-quality image processing section provided in the image processing device, instead of the image signal from the image processing section, through the communication channel interface section to the image display section, based on the detection result when the image processing device is in operation, the display image switch section then causing the image display section to display a high-quality image based on the high-quality image signal.

According to a second aspect of the invention, there is provided an image processing device which can be connected to a television receiver through a predetermined communication channel, the image processing device comprising:

a communication channel interface section which transfers information between the image processing device and the television receiver when the image processing device has been connected to the television receiver through the communication channel;

a tuner unit which receives television broadcasting on a desired channel based on indication information input from the television receiver through the communication channel interface section and acquires an image signal corresponding to the broadcasting; and a high-quality image processing section which subjects the image signal acquired by the tuner unit to predetermined high-quality image processing and transmits the processed image signal to the television receiver through the communication channel interface section as a high-quality image signal.

According to a third aspect of the invention, there is provided a high-quality image display system comprising:

an image processing device; and a television receiver to which the image processing device can be connected through a predetermined communication channel, wherein the television receiver includes:

an operation signal reception section which receives an operation signal transmitted from a remote control section;

a first tuner unit which receives television broadcasting on a desired channel based on indication information obtained from the operation signal and acquires an image signal corresponding to the broadcasting;

an image processing section which subjects the image signal acquired by the first tuner unit to predetermined image processing and outputs the processed image signal;

an image display section which displays an image based on the image signal output from the image processing section;

a first communication channel interface section which transfers information between the television receiver and the image processing device when the image processing device has been connected to the television receiver through the communication channel;

an image processing device detection section which detects whether or not the image processing device connected to the television receiver is in operation, through the first communication channel interface section and outputs the detection result;

an indication information transmission section which transmits the indication information obtained from the operation signal to the image processing device instead of the first tuner unit through the first communication channel interface section, based on the detection result when the image processing device is in operation; and a display image switch section which supplies a high-quality image signal from the image processing device, instead of the image signal from the image processing section, through the first communication channel interface section to the image display section, based on the detection result when the image processing device is in operation, the display image switch section then causing the image display section to display a high-quality image based on the high-quality image signal, and wherein the image processing device includes:

a second communication channel interface section which transfers information between the image processing device and the television receiver when the image processing device has been connected to the television receiver through the communication channel;

a second tuner unit which receives television broadcasting on a desired channel based on the indication information when the indication information has been input from the television receiver through the second communication channel interface section and acquires an image signal corresponding to the broadcasting; and a high-quality image processing section which subjects the image signal acquired by the second tuner unit to predetermined high-quality image processing and transmits the processed image signal to the television receiver through the second communication channel interface section as the high-quality image signal.

DETAILED DESCRIPTION OF THE EMBODIMENT

Figure 1:
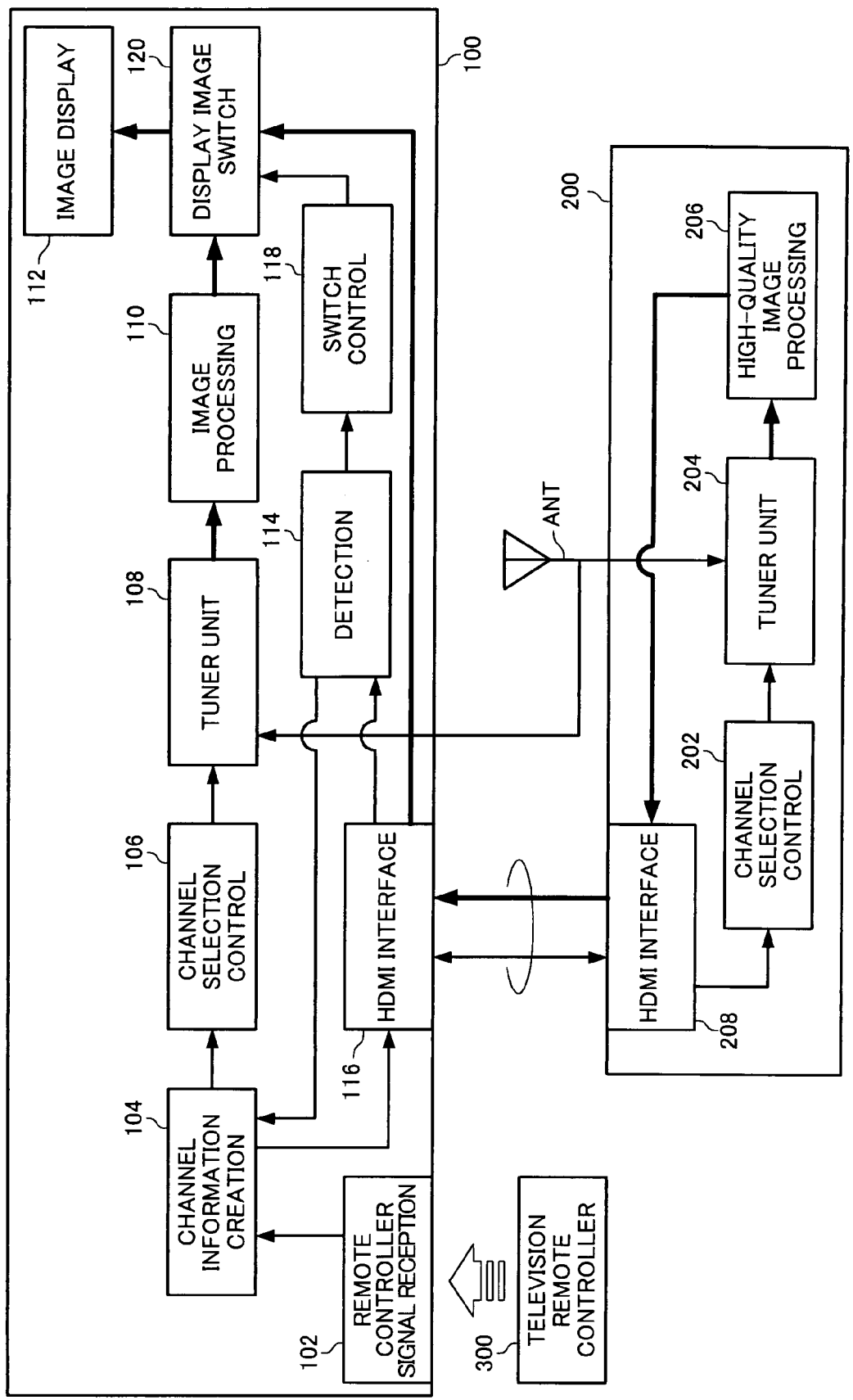
FIG. 1 is a block diagram showing a schematic configuration of a high-quality image display system according to a first embodiment of the invention.

The invention may provide technology capable of changing the channel or adjusting the image quality of an image processing device by using a television remote controller.

According to one embodiment of the invention, there is provided a television receiver to which an image processing device can be connected through a predetermined communication channel, the television receiver comprising:

an operation signal reception section which receives an operation signal transmitted from a remote control section;

a first tuner unit which receives television broadcasting on a desired channel based on indication information obtained from the operation signal and acquires an image signal corresponding to the broadcasting;

an image processing section which subjects the image signal acquired by the first tuner unit to predetermined image processing and outputs the processed image signal;

an image display section which displays an image based on the image signal output from the image processing section;

a communication channel interface section which transfers information between the television receiver and the image processing device when the image processing device has been connected to the television receiver through the communication channel;

an image processing device detection section which detects whether or not the image processing device connected to the television receiver is in operation, through the communication channel interface section and outputs the detection result;

an indication information transmission section which transmits the indication information obtained from the operation signal to a second tuner unit provided in the image processing device instead of the first tuner unit through the communication channel interface section, based on the detection result when the image processing device is in operation; and a display image switch section which supplies a high-quality image signal from a high-quality image processing section provided in the image processing device, instead of the image signal from the image processing section, through the communication channel interface section to the image display section, based on the detection result when the image processing device is in operation, the display image switch section then causing the image display section to display a high-quality image based on the high-quality image signal.

The term "indication information" used herein refers to a concept including various types of information derived from the operation signal. In more detail, the term "indication information" includes a data code derived from the operation signal, channel information derived from the data code, and the like. When the remote control section includes a channel button, a menu button, an arrow button, a select button, and the like, the term "data code" used herein refers to a code corresponding to each button such as a code indicating the channel number. The term "channel information" used herein refers to information necessary for the first tuner unit or the second tuner unit to receive television broadcasting on a desired channel. For example, the term "channel information" refers to information including information of the frequency of television broadcasting corresponding to the channel button of the remote control section.

In the television receiver to which the image processing device in operation is connected, when the user presses the channel button of the remote control section, for example, the indication information corresponding to the channel button is not transmitted to the first tuner unit provided in the television receiver, but is transmitted to the image processing device. When the image processing device connected to the television receiver receives the indication information and transmits the high-quality image signal of television broadcasting corresponding to the indication information to the television receiver, the image displayed on the image display section of the television receiver is automatically switched to the high-quality image input from the image processing device.

Therefore, when the image processing device is connected to the television receiver and is in operation, the user can change the channel of the image processing device by using a television remote controller as the remote control section, and the high-quality image of television broadcasting corresponding to the channel is automatically displayed on the image display section. As a result, complexity of selectively using two remote controllers, such as switching the display screen using the television remote controller and changing the channel using the dedicated remote controller when viewing the high-quality image, can be eliminated.

The television receiver of this embodiment may further comprise:

an image quality adjustment section which creates an image quality adjustment menu based on the indication information obtained from the operation signal, superimposes the menu on an image expressed by the image signal, and subjects the image processing section to desired image quality adjustment.

Such a configuration makes it possible for the user to adjust the quality of the image displayed on the television receiver by using the remote control section.

In the television receiver of this embodiment, the communication channel interface section may be an interface section conforming to the high-definition multimedia interface (HDMI) standard.

Such a communication channel interface section makes it possible to transmit and receive an image, sound, and a control signal through one cable, when the communication channel interface section of the image processing device conforms to the HDMI standard. Moreover, a control signal can be bidirectionally transmitted. This makes it unnecessary to provide complicated wiring.

According to one embodiment of the invention, there is provided an image processing device which can be connected to a television receiver through a predetermined communication channel, the image processing device comprising:

a communication channel interface section which transfers information between the image processing device and the television receiver when the image processing device has been connected to the television receiver through the communication channel;

a tuner unit which receives television broadcasting on a desired channel based on indication information input from the television receiver through the communication channel interface section and acquires an image signal corresponding to the broadcasting; and a high-quality image processing section which subjects the image signal acquired by the tuner unit to predetermined high-quality image processing and transmits the processed image signal to the television receiver through the communication channel interface section as a high-quality image signal.

In such configuration, if the user presses the channel button of the remote control section, for example, the image processing device subjects the image signal of television broadcasting corresponding to the channel button to the high-quality image processing, and transmits the processed image signal to the television receiver as the high-quality image signal.

Therefore, when the television receiver to which the image processing device is connected can transmit the indication information according to the operation signal from the remote control section to the television receiver, to the image processing device, and can display the high-quality image on the image display section based on the high-quality image signal from the image processing device, the high-quality image can be displayed on the display screen of the television receiver if the user uses the remote control section and changes the channel.

The image processing device of this embodiment may further comprise:

an image quality adjustment section which creates an image quality adjustment menu based on the indication information input from the television receiver through the communication channel interface section, superimposes the menu on a high-quality image expressed by the high-quality image signal, and subjects the high-quality image processing section to desired image quality adjustment.

If the user presses the menu button of the remote control section, for example, such configuration makes it possible for the image processing device to create the image quality adjustment menu of the image processing device based on the indication information corresponding to the menu button. The image processing device subjects the image signal to the high-quality image processing requested by the user based on the indication information, and transmits the processed image signal to the television receiver together with the menu.

Therefore, when the television receiver to which the image processing device is connected can transmit the indication information according to the operation signal from the remote control section to the television receiver, to the image processing device and can display the high-quality image on the image display section based on the high-quality image signal and the menu input from the image processing device, the user can adjust the image quality of the image processing device by using the remote control section and can display the high-quality image with the quality requested by the user on the display screen of the television receiver.

In the image processing device of this embodiment, the communication channel interface section may be an interface section conforming to the high-definition multimedia interface (HDMI) standard.

Such a communication channel interface section makes it possible to transmit and receive an image, sound, and a control signal through one cable, when the communication channel interface section of the television receiver conforms to the HDMI standard. Moreover, a control signal can be bidirectionally transmitted. This makes it unnecessary to provide complicated wiring.

Note that the invention is not limited to the invention of a device such as the above television receiver and image processing device, but may be implemented as a high-quality image display system, a high-quality image display method, and the like. The invention may also be implemented by a computer program for implementing the method or the device, a recording medium in which the computer program is recorded, and the like.

Embodiments of the invention are described below.

First Embodiment

Figure 2:
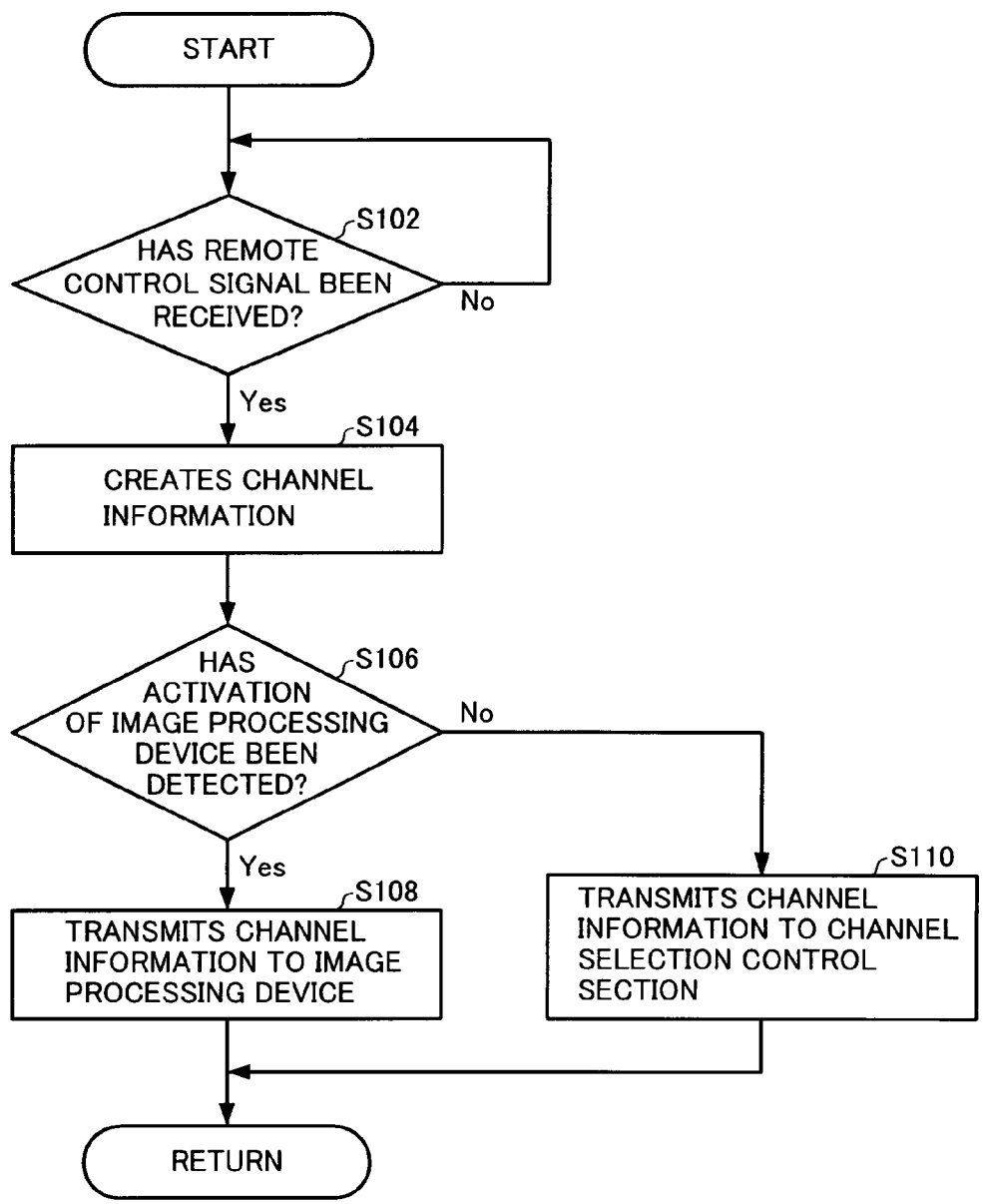
FIG. 2 is a flowchart showing a process of switching the transmission destination of channel information in the high-quality image display system shown in FIG. 1.
Figure 3:
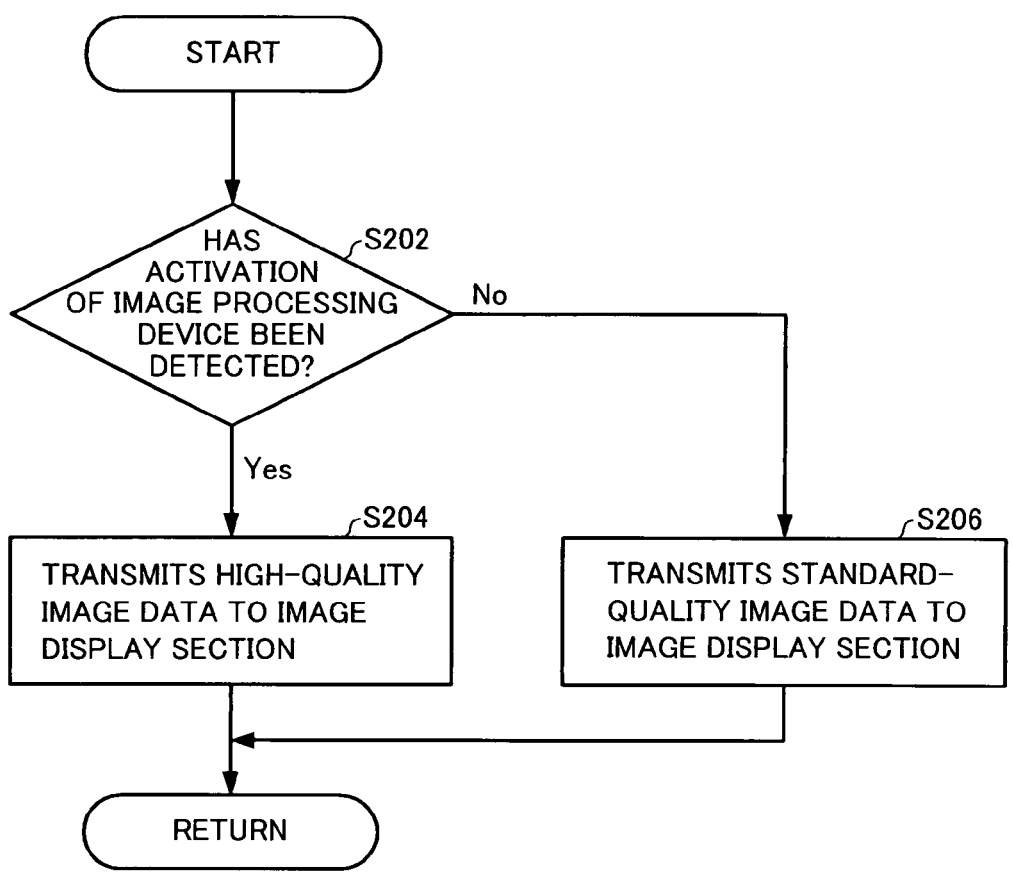
FIG. 3 is a flowchart showing a process in which a display image switch section 120 switches an image transmitted to an image display section 112 in the high-quality image display system shown in FIG. 1.

A first embodiment is described below with reference to FIGS. 1 to 3. FIG. 1 is a block diagram showing a schematic configuration of a high-quality image display system according to the first embodiment of the invention. FIG. 2 is a flowchart showing the flow in which a channel information creation section 104 switches the transmission destination of channel information. FIG. 3 is a flowchart showing the flow in which a display image switch section 120 switches an image transmitted to an image display section 112.

As shown in FIG. 1, the high-quality image display system according to this embodiment includes a television receiver 100, an image processing device 200, and a television remote controller 300.

The television receiver 100 mainly includes a remote control signal reception section 102, a channel information creation section 104, a channel selection control section 106, a tuner unit 108, an image processing section 110, an image display section 112, a detection section 114, an HDMI interface section 116, a switch control section 118, and a display image switch section 120. The channel information creation section 104, the channel selection control section 106, the detection section 114, and the switch control section 118 are implemented using a CPU (not shown) provided in the television receiver 100 by causing the CPU to execute a computer program stored in a memory (not shown).

In this embodiment, the television receiver 100 is a standard-definition television (SDTV) receiver, and the image display section 112 is a liquid crystal display.

The detection section 114 has a function of detecting activation of the image processing device 200 and informing the channel information creation section 104 and the switch control section 118 to that effect. In more detail, when connecting the image processing device 200 with the television receiver 100 using an HDMI cable and activating the image processing device 200, the detection section 114 detects that the image processing device 200 has been activated through the HDMI interface section 116. The detection section 114 transmits a signal indicating that the detection section 114 has detected activation of the image processing device 200 (hereinafter called "detection signal") to the channel information creation section 104 and the switch control section 118. When the image processing device 200 is not activated, the detection signal is not transmitted to the channel information creation section 104.

When the channel information creation section 104 has received the detection signal, the channel information creation section 104 transmits channel information to the image processing device 200 through the HDMI interface section 116. When the channel information creation section 104 has not received the detection signal, the channel information creation section 104 transmits the channel information to the channel selection control section 106.

The switch control section 118 transmits a control signal to the display image switch section 120. When the switch control section 118 has received the detection signal, the switch control section 118 controls the display image switch section 120 so that the display image switch section 120 transmits high-quality image data (image data subjected to high-quality image processing by the image processing device 200) to the image display section 112. When the switch control section 118 has not received the detection signal, the switch control section 118 controls the display image switch section 120 so that the display image switch section 120 transmits standard-quality image data (image data transmitted from the image processing section 110) to the image display section 112.

The remote control signal reception section 102 corresponds to the operation signal reception section. The channel information creation section 104 corresponds to the indication information transmission section. The tuner unit 108 corresponds to the first tuner unit. The detection section 114 corresponds to the image processing device detection section. The HDMI interface section 116 corresponds to the first communication channel interface section.

The image processing device 200 mainly includes a channel selection control section 202, a tuner unit 204, a high-quality image processing section 206, and an HDMI interface section 208. The channel selection control section 202 is implemented using a CPU (not shown) provided in the image processing device by causing the CPU to execute a computer program stored in a memory (not shown).

The tuner unit 204 corresponds to the second tuner unit.

The television receiver 100 and the image processing device 200 are connected through one HDMI cable. In FIG. 1, the HDMI interface section 116 and the HDMI interface section 208 are connected using two arrows in order to distinguish the image signal (image data) from other signals. In the actual situation, the HDMI interface section 116 and the HDMI interface section 208 are connected through one cable. In FIG. 1, the bold arrow indicates the flow of the image signal (image data).

The television remote controller 300 is a television remote controller attached to the television receiver 100, for example. The television remote controller 300 includes a channel button (not shown). The television remote controller 300 transmits a remote control signal using infrared radiation as a carrier. The remote control signal includes a data code corresponding to the channel button of the remote controller, a reader code for informing the television receiver of transmission of the remote control signal, a custom code which is the identifier of the manufacturer and the device, and the like.

The HDMI cable corresponds to the predetermined communication channel, and the television remote controller 300 corresponds to the remote control section.

The operation of the television receiver 100 when the image processing device 200 is not activated is described below with reference to FIGS. 2 and 3.

When the user has pressed the channel button "1" of the television remote controller 300, the remote control signal including the data code indicating the channel "1" is transmitted from the television remote controller 300. When the remote control signal reception section 102 of the television receiver 100 has received the remote control signal, the remote control signal reception section 102 amplifies the remote control signal, extracts the data code, and transmits the extracted data code to the channel information creation section 104 (step S102). The channel information creation section 104 creates the channel information including the frequency of the television broadcasting radio wave corresponding to the channel "1" based on the data code (step S104). Since the image processing device 200 is not activated so that the channel information creation section 104 does not receive the detection signal from the detection section 114 (step S106), the channel information creation section 104 transmits the channel information to the channel selection control section 106 (step S110). The channel selection control section 106 generates a tuner control signal for controlling channel selection of the tuner unit 108 based on the channel information, and transmits the tuner control signal to the tuner unit 108.

The tuner unit 108 receives the television broadcasting radio wave through an antenna ANT according to the tuner control signal transmitted from the channel selection control section 106, selects the television broadcasting radio wave with a frequency corresponding to the channel "1", extracts the image signal from the television broadcasting radio wave, and transmits the extracted image signal to the image processing section 110. The image processing section 110 subjects the image signal transmitted from the tuner unit 108 to various conversions, and transmits the resulting image signal to the display image switch section 120 as image data. In more detail, the image processing section 110 performs analog/digital conversion (hereinafter abbreviated as "A/D conversion"), interlace/progressive conversion (hereinafter abbreviated as "I/P conversion"), color conversion, resolution conversion, image quality conversion, and the like. The term "A/D conversion" used herein means digitalizing the input analog signal, and the term "I/P conversion" used herein means converting an interlaced image into a progressive image. The term "resolution conversion" used herein means converting the resolution of the image signal into an optimum resolution for the liquid crystal panel used as the image display section 112, and the term "color conversion" used herein means converting the input luminance signal or color difference signal into an RGB signal. The term "image quality conversion" used herein means converting the RGB signal into an RGB signal of which the image brightness, contrast, color tone, and the like have been adjusted.

Since the image processing device 200 is not activated, the switch control section 118 does not receive the detection signal from the detection section 114 (step S202). Therefore, the display image switch section 120 has been controlled by the switch control section 118 so that the display image switch section 120 transmits the standard-quality image data to the image display section 112. Accordingly, the display image switch section 120 transmits the standard-quality image data transmitted from the image processing section 110 to the image display section 112 (step S206).

This allows the image display section 112 to display an image expressed by the standard-quality image data transmitted from the display image switch section 120. Specifically, the television broadcasting image corresponding to the channel "1" is displayed on the image display section 112 at a standard quality.

The operations of the television receiver 100 and the image processing device 200 when the image processing device 200 has been activated are described below. The operation when the user presses the channel button "1" of the television remote controller 300 and the channel information creation section 104 creates the channel information is the same as described above. Therefore, description thereof is omitted.

Since the image processing device 200 has been activated, the detection section 114 has detected activation of the image processing device 200 and transmitted the detection signal to the channel information creation section 104 (step S106). Since the channel information creation section 104 has received the detection signal, the channel information creation section 104 transmits the channel information created in the step S104 to the image processing device 200 through the HDMI interface section 116 (step S108).

The image processing device 200 receives the channel information through the HDMI interface section 208, and transmits the channel information to the channel selection control section 202. The channel selection control section 202 generates a tuner control signal for controlling the tuner unit 204 based on the channel information in the same manner as the channel selection control section 106 provided in the television receiver 100, and transmits the tuner control signal to the tuner unit 204. The tuner unit 204 receives the television broadcasting radio wave through the antenna ANT according to the tuner control signal transmitted from the channel selection control section 202, selects the television broadcasting radio wave with a frequency corresponding to the channel "1", extracts the image signal from the television broadcasting radio wave, and transmits the extracted image signal to the high-quality image processing section 206. The high-quality image processing section 206 subjects the image signal transmitted from the tuner unit 204 to various conversions in the same manner as the image processing section 110 provided in the television receiver 100, and transmits the resulting image signal to the television receiver 100 as high-quality image data through the HDMI interface section 208. In the high-quality image processing section 206, the high-quality image processing is carried out by performing A/D conversion with a number of bits greater than that of the standard-quality television receiver 100, I/P conversion using motion adaptive interpolation, noise removal, processing of increasing the frame rate, and the like.

The television receiver 100 receives the high-quality image data through the HDMI interface section 116, and transmits the high-quality image data to the display image switch section 120. Since the image processing device 200 has been activated so that the switch control section 118 has received the detection signal from the detection section 114 (step S202), the display image switch section 120 has been controlled by the switch control section 118 so that the display image switch section 120 transmits the high-quality image data to the image display section 112. Therefore, the display image switch section 120 transmits the high-quality image data to the image display section 112 (step S204).

This allows the image display section 112 to display an image expressed by the high-quality image data transmitted from the display image switch section 120. According to the above operations, the quality of the television broadcasting image corresponding to the channel "1" is increased when the user presses the channel button "1" of the television remote controller 300, and the resulting image is displayed on the image display section 112 of the television receiver 100.

According to this embodiment, the channels of the television receiver 100 and the image processing device 200 can be changed using the television remote controller 300 attached to the television receiver 100, as described above. The standard-quality image of the television receiver 100 is displayed on the image display section 112 when the image processing device 200 is not activated, and is automatically switched to the high-quality image when the image processing device 200 has been activated. Specifically, when the image processing device 200 has been activated, the user can view the high-quality image by normally operating the television receiver 100 without using a dedicated remote controller of the image processing device 200 or switching the screen of the television receiver 100, for example. This makes it unnecessary for the user to selectively use a dedicated remote controller of the image processing device 200 and the television remote controller 300 of the television receiver 100.

This embodiment has been described above taking an example in which the television receiver 100 is an SDTV receiver and the image display section 112 is a liquid crystal display. Note that the television receiver 100 may be an HDTV or the like, and the image display section 112 may be a CRT display or the like.

Second Embodiment

Figure 4:
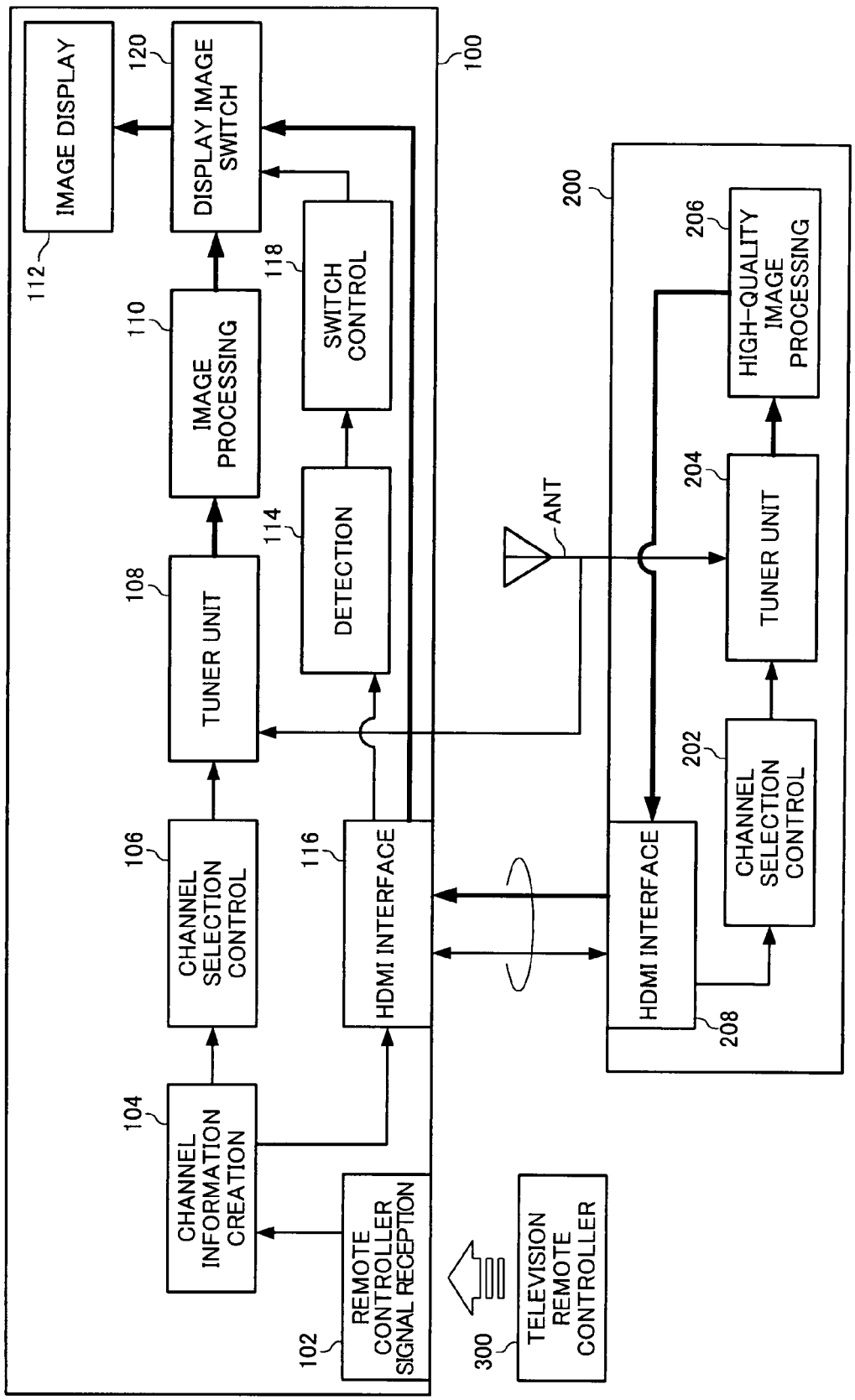
FIG. 4 is a block diagram showing a schematic configuration of a high-quality image display system according to a second embodiment of the invention.
Figure 5:
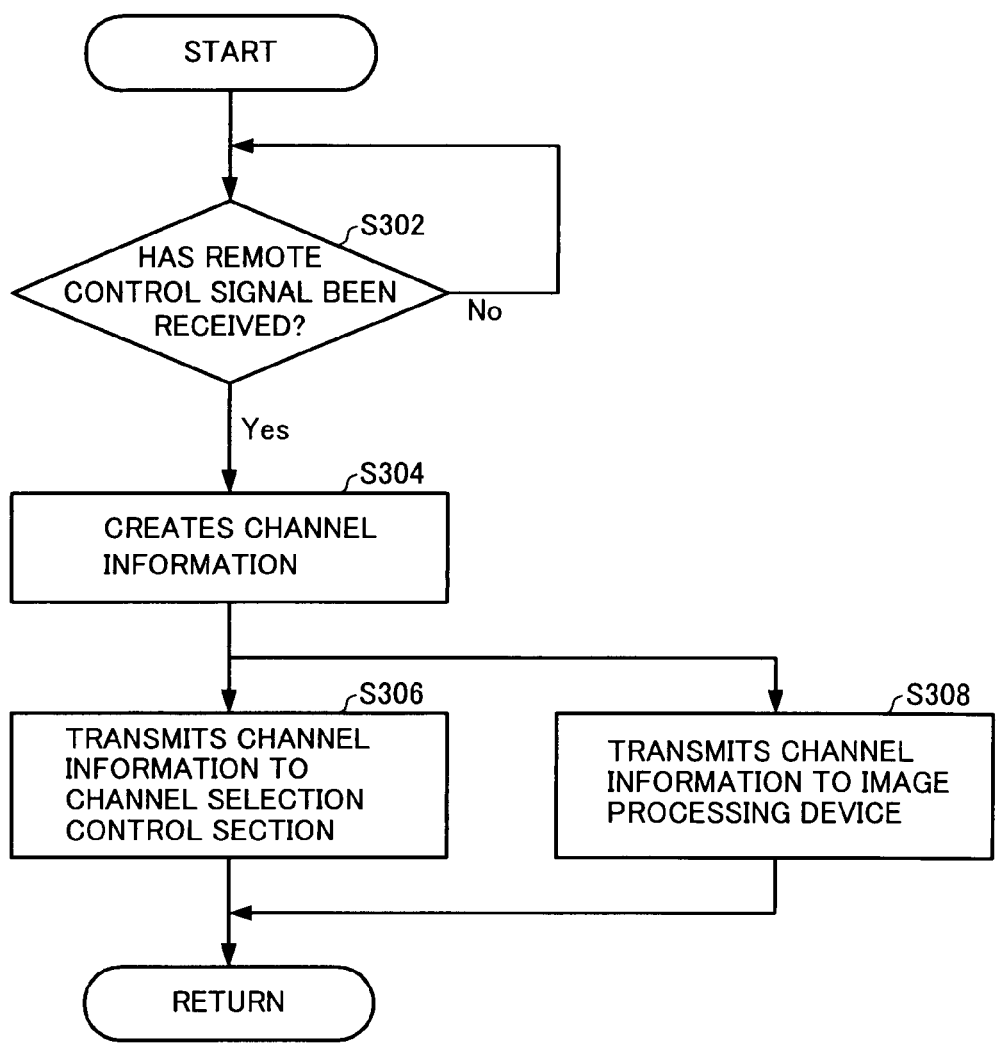
FIG. 5 is a flowchart showing a process of transmitting channel information in the high-quality image display system shown in FIG. 2.

A second embodiment is described below with reference to FIGS. 3 to 5. FIG. 4 is a block diagram showing a schematic configuration of a high-quality image display system according to the second embodiment of the invention. FIG. 5 is a flowchart showing the flow of the channel information created by the channel information creation section 104. FIG. 3 is a flowchart showing the flow in which the display image switch section 120 switches an image transmitted to the image display section 112. As shown in FIG. 4, the high-quality image display system according to this embodiment includes the television receiver 100, the image processing device 200, and the television remote controller 300. The television receiver 100 and the image processing device 200 are connected through one HDMI cable in the same manner as in the first embodiment.

The television receiver 100 includes the same constituent elements as the constituent elements of the television receiver 100 according to the first embodiment shown in FIG. 1. The channel information creation section 104, the channel selection control section 106, the detection section 114, and the switch control section 118 are implemented using a CPU (not shown) provided in the television receiver 100 by causing the CPU to execute a computer program stored in a memory (not shown). The same constituent elements as in the first embodiment are indicated by the same reference numerals. The bold arrow indicates the flow of the image signal (image data).

The operations of the channel information creation section 104 and the detection section 114 making up the television receiver 100 differ from those in the first embodiment. The channel information creation section 104 creates the channel information and then transmits the channel information to the channel selection control section 106 and the image processing device 200. The channel information is transmitted to the image processing device 200 through the HDMI interface section 116.

The detection section 114 has a function of detecting activation of the image processing device 200 and informing the switch control section 118 to that effect. In more detail, when connecting the image processing device 200 with the television receiver 100 using the HDMI cable and activating the image processing device 200, the detection section 114 detects that the image processing device 200 has been activated through the HDMI interface section 116, and transmits the detection signal to the switch control section 118. When the image processing device 200 is not activated, the detection signal is not transmitted to the switch control section 118.

The image processing device 200 is configured in the same manner as in the first embodiment. Each constituent element of the image processing device 200 operates in the same manner as in the first embodiment. The television remote controller 300 is a television remote controller attached to the television receiver 100 in the same manner as in the first embodiment. The television remote controller 300 transmits the remote control signal using infrared radiation as a carrier.

The operation of the television receiver 100 according to this embodiment when the image processing device 200 is not activated is described below.

When the user has pressed the channel button "1" of the television remote controller 300, the remote control signal including the data code indicating the channel "1" is transmitted from the television remote controller 300. When the remote control signal reception section 102 of the television receiver 100 has received the remote control signal, the remote control signal reception section 102 amplifies the remote control signal, extracts the data code, and transmits the extracted data code to the channel information creation section 104 (step S302). The channel information creation section 104 creates the channel information including the frequency of the television broadcasting radio wave corresponding to the channel "1" based on the data code (step S304). The channel information creation section 104 transmits the channel information to the channel selection control section 106 (step S306), and transmits the channel information to the image processing device 200 through the HDMI interface section 116 (step S308). The HDMI interface section 116 transmits the channel information to the image processing device 200. However, since the image processing device 200 is not activated, the image processing device 200 does not receive the channel information.

The channel selection control section 106 generates the tuner control signal for controlling channel selection of the tuner unit 108 based on the channel information, and transmits the tuner control signal to the tuner unit 108. The tuner unit 108 receives the television broadcasting radio wave through the antenna ANT according to the tuner control signal transmitted from the channel selection control section 106, selects the television broadcasting radio wave with a frequency corresponding to the channel "1", extracts the image signal from the television broadcasting radio wave, and transmits the extracted image signal to the image processing section 110. The image processing section 110 subjects the image signal transmitted from the tuner unit 108 to various conversions, and transmits the resulting image signal to the display image switch section 120 as image data.

In this case, since the image processing device 200 is not activated (step S202), the display image switch section 120 transmits the standard-quality image data transmitted from the image processing section 110 to the image display section 112 according to the control signal transmitted from the switch control section 118 (step S206). The image display section 112 displays an image expressed by the received standard-quality image data. Specifically, the television broadcasting image corresponding to the channel "1" is displayed on the image display section 112 at a standard quality.

The operations of the television receiver 100 and the image processing device 200 when the image processing device 200 has been activated are described below. The operation when the user presses the channel button "1" of the television remote controller 300 so that the channel information transmission section 106 transmits the channel information to the channel selection control section 106 (step S306) and transmits the channel information to the image processing device 200 through the HDMI interface section 116 (step S308) is the same as described above. Therefore, description thereof is omitted.

The channel selection control section 106, the tuner unit 108, and the image processing section 110 of the television receiver 100 operate in the same manner as described above, and transmit the image data of television broadcasting corresponding to the channel "1" to the display image switch section 118.

Since the image processing device 200 has been activated, the image processing device 200 receives through the HDMI interface section 208 the channel information transmitted from the television receiver 100 through the HDMI interface section 116. The channel selection control section 202 controls the tuner unit 204 based on the channel information so that the tuner unit 204 selects the television broadcasting radio wave with a frequency corresponding to the channel "1" from the television broadcasting radio wave received through the antenna ANT, extracts the image signal from the television broadcasting radio wave, and transmits the extracted image signal to the high-quality image processing section 206 in the same manner as in the first embodiment. The high-quality image processing section 206 subjects the image signal transmitted from the tuner unit 204 to the high-quality image processing, and transmits the resulting image signal to the television receiver 100 as the high-quality image data through the HDMI interface section 208.

The television receiver 100 receives the high-quality image data through the HDMI interface section 116, and transmits the high-quality image data to the display image switch section 120. The detection section 114 has detected activation of the image processing device 200 and transmitted the detection signal to the switch control section 118 (step S202). Since the switch control section 118 has received the detection signal, the display image switch section 120 has been controlled by the switch control section 118 so that the display image switch section 120 transmits the high-quality image data to the image display section 112. Therefore, the display image switch section 120 transmits the high-quality image data input from the image processing device 200 to the image display section 112 (step S204).

This allows the image display section 112 to display an image expressed by the high-quality image data transmitted from the display image switch section 120. According to the above operations, the quality of the television broadcasting image corresponding to the channel "1" is increased when the user presses the channel button "1" of the television remote controller 300, and the resulting image is displayed on the image display section 112 of the television receiver 100.

As described above, the high-quality image display system according to the second embodiment can achieve the same effects as in the first embodiment.

Third Embodiment

Figure 6:
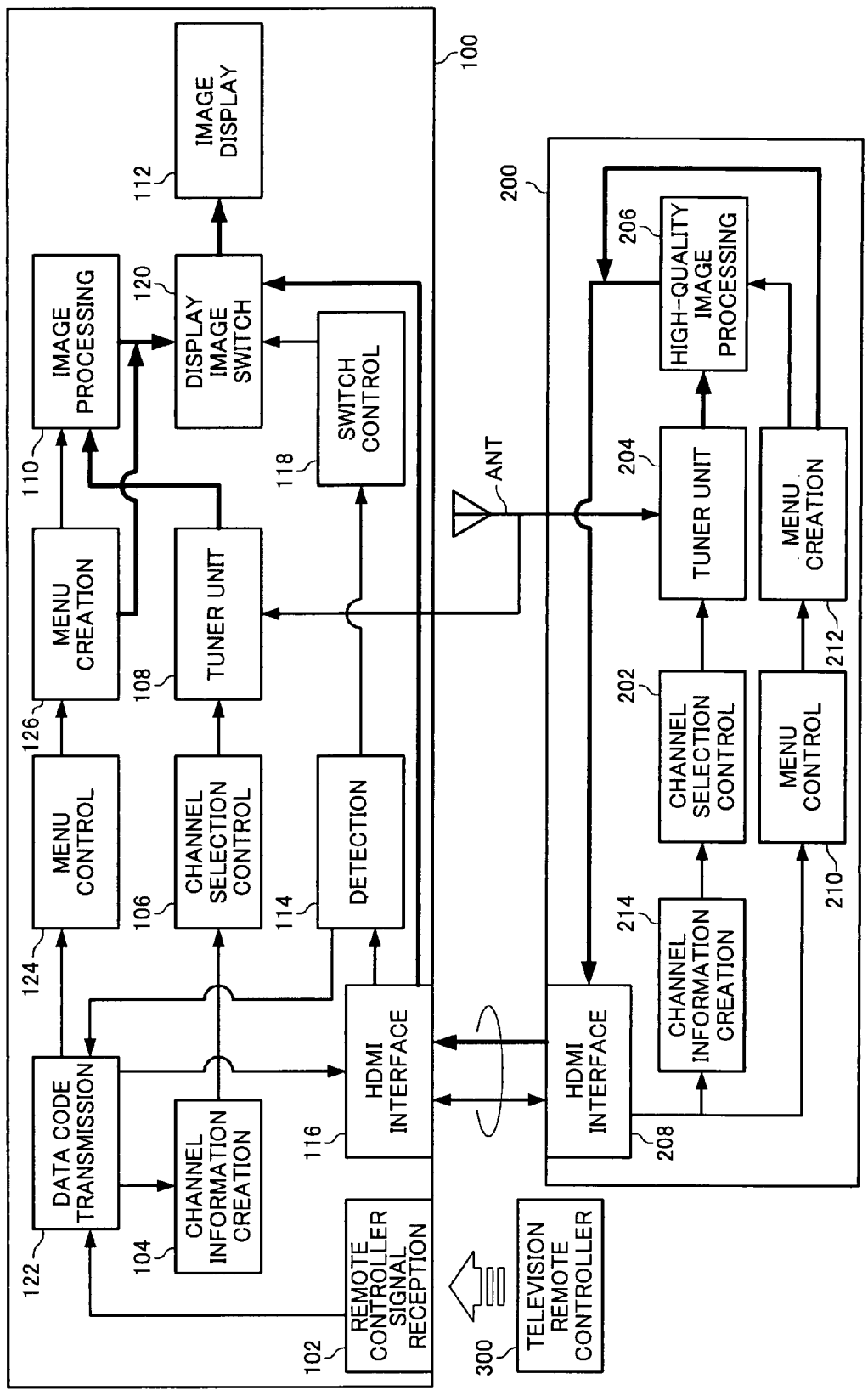
FIG. 6 is a block diagram showing a schematic configuration of a high-quality image display system according to a third embodiment of the invention.

A third embodiment is described below with reference to FIG. 6. FIG. 6 is a block diagram showing a schematic configuration of a high-quality image display system according to the third embodiment of the invention. As shown in FIG. 6, the high-quality image display system according to this embodiment includes the television receiver 100, the image processing device 200, and the television remote controller 300. The television receiver 100 and the image processing device 200 are connected through one HDMI cable in the same manner as in the first embodiment.

The television receiver 100 includes a data code transmission section 122, a menu control section 124, and a menu creation section 126 in addition to the constituent elements of the television receiver 100 according to the first embodiment shown in FIG. 1. The channel information creation section 104, the channel selection control section 106, the detection section 114, the data code transmission section 122, the menu control section 124, and the switch control section 118 are implemented using a CPU (not shown) provided in the television receiver 100 by causing the CPU to execute a computer program stored in a memory (not shown). The same constituent elements as in the first embodiment are indicated by the same reference numerals. The bold arrow indicates the flow of the image signal (image data).

In this embodiment, the menu includes items relating to image quality adjustments such as the brightness, contrast, color depth, and hue of the image displayed on the image display section 112. For example, when the user has pressed a "menu" button of the television remote controller 300, an image indicating the menu items is displayed on the image display section 112. When the user has selected the item "brightness" by operating "t" and "1" buttons and a "select" button, a level gauge is displayed together with the characters "brightness". When the user has pressed the "t" button, an image is displayed in which the level display of the level gauge changes. When the user has again pressed the "menu" button, the menu image disappears, and only an image at the brightness specified by the user is displayed.

The detection section 114 has a function of detecting activation of the image processing device and informing the data code transmission section 122 and the switch control section 118 to that effect. In more detail, when connecting the image processing device 200 with the television receiver 100 using the HDMI cable and activating the image processing device 200, the detection section 114 detects that the image processing device 200 has been activated through the HDMI interface section 116, and transmits the detection signal to the data code transmission section 122 and the switch control section 118. When the image processing device 200 is not activated, the detection signal is not transmitted to the data code transmission section 122 and the switch control section 118.

After the data code transmission section 122 has received the detection signal from the detection section 114, the data code transmission section 122 transmits the data code to the image processing device 200 through the HDMI interface section 116. When the data code transmission section 122 has not received the detection signal, the data code transmission section 122 transmits the data code to the channel information creation section 104 and the menu control section 124.

When the received data code indicates the channel button number, the channel information creation section 104 creates the channel information and transmits the channel information to the channel selection control section 106. When the data code relates to the menu (i.e. when the data code indicates the "menu" button, the "↑" or "↓" button, the "select" button, or the like), the menu control section 124 generates a menu control signal for controlling the menu creation section 126, and transmits the menu control signal to the menu creation section 126.

In more detail, when the menu control section 124 has received the data code indicating the "menu" button, the menu control section 124 generates the control signal for causing the menu creation section 126 to create menu image data. When the menu control section 124 has received the data code indicating the "↑" or "↓" button or the "select" button thereafter, the menu control section 124 refers to the previously received data code, and generates the control signal for causing the menu creation section 126 to create the next menu image data. For example, when the menu control section 124 has received the data code indicating the "1" button after the data code indicating the "menu" button, the menu control section 124 generates the menu control signal for moving the cursor of the menu image. When the user has pressed various buttons, selected brightness adjustment (pressed the "select" button), and then pressed the "1" button, the menu control section 124 generates the menu control signal for decreasing the level of the level gauge in the menu image. When the menu control section 124 has again received the data signal indicating the "menu" button, the menu control section 124 generates the menu control signal for preventing the menu creation section 126 from transmitting the menu image data. The menu control section 124 also generates the menu control signal for causing the menu creation section 126 to create image quality adjustment information relating to the image quality adjustment specified by the user and transmit the image quality adjustment information to the image processing section 110. The term "menu image data" used herein refers to image data for displaying the image quality adjustment items such as "brightness", "color depth", and "hue" or the level gauge indicating the level of "brightness" or the like on the display screen 112, for example.

The menu creation section 126 creates menu image data indicating the menu items and information relating to the image quality adjustments specified by the user according to the menu control signal, and superimposes the menu image data on the image data transmitted from the image processing section 110. The menu creation section 126 also creates the image quality adjustment information relating to the image quality adjustment specified by the user and transmits the image quality adjustment information to the image processing section 110. For example, when the user has set the "brightness" level at "3" by pressing the "1" button of the television remote controller 300, the menu creation section 126 creates the image quality adjustment information which directs the image processing section 110 to perform image processing at a brightness corresponding to the level "3".

The data code transmission section 122 corresponds to the indication information transmission section, and the menu creation section corresponds to the image quality adjustment section.

The image processing device 200 includes a channel information creation section 214, a menu control section 210, and a menu creation section 212 in addition to the constituent elements of the image processing device 200 according to the first embodiment shown in FIG. 1. The channel information creation section 214, the channel selection control section 202, and the menu control section 210 are implemented using a CPU (not shown) provided in the image processing device 200 by causing the CPU to execute a computer program stored in a memory (not shown).

The menu control section 210 has the same function as the menu control section 124 making up the television receiver 100. Note that the menu used in the image processing device 200 includes an item which designates "clearness" for converting the image into an image of which the resolution of the details and the solidity are increased, an item which designates "neatness" for reducing noise while maintaining the image quality, and the like in addition to the items of the menu used in the television receiver 100.

The channel information creation section 214 has the same function as the channel information creation section 104 making up the television receiver 100. The menu creation section 212 has the same function as the menu creation section 126 making up the television receiver 100.

The menu creation section 210 corresponds to the image quality adjustment section.

The television remote controller 300 is a television remote controller attached to the television receiver 100, for example. The television remote controller 300 includes a power button, a channel button, a menu button, an arrow button, a select button, and the like (not shown). The menu button, the arrow button, the select button, and the like are mainly used when performing a menu operation such as image quality adjustment. The television remote controller 300 transmits a remote control signal similar to that used in the first embodiment using infrared radiation as a carrier.

The operation of the television receiver 100 according to this embodiment when the image processing device 200 is not activated is described below. The television receiver 100 operates in the same manner as in the first embodiment when the user has pressed the channel button of the television remote controller 300. Therefore, description thereof is omitted.

Since the image processing device 200 is not activated, a standard-quality image is displayed on the image display section 112. When the user has pressed the "menu" button of the television remote controller 300 in this state, the remote control signal including the data code indicating the "menu" button is transmitted from the television remote controller 300. When the remote control signal reception section 102 of the television receiver 100 has received the remote control signal, the remote control signal reception section 102 amplifies the remote control signal, extracts the data code, and transmits the extracted data code to the data code transmission section 122. Since the image processing device 200 is not activated, the data code transmission section 122 does not receive the detection signal from the detection section 114. Therefore, the data code transmission section 122 transmits the data code to the channel information creation section 104 and the menu control section 124, as described above.

Since the data code transmitted from the data code transmission section 122 is the data code indicating the "menu" button, the menu control section 124 generates the control signal for causing the menu creation section 126 to create the menu image data, and transmits the menu image data to the menu creation section 126, as described above. The menu creation section 126 creates the menu image data according to the menu control signal transmitted from the menu control section 124, and superimposes the menu image data on the image data transmitted from the image processing section 110. The image display section 112 superimposes the image expressed by the menu image data on the image expressed by the image data transmitted from the image processing section 110, and displays the resulting image.

When the user has selected the item "brightness" by operating the "↑" and "↓" buttons and the "select" button and then pressed the "↑" button, the menu creation section 126 creates the menu image data which changes the display of the level gauge, and superimposes the menu image data on the image data transmitted from the image processing section 110. The menu creation section 126 also creates the image quality adjustment information corresponding to the brightness indicated by the level gauge, and transmits the image quality adjustment information to the image processing section 110. The image processing section 110 adjusts the brightness based on the image quality adjustment information transmitted from the menu creation section 126 when subjecting the image signal transmitted from the tuner unit 108 to image processing. Therefore, an image at the brightness specified by the user and the brightness level gauge are displayed on the image display section 112.

When the user has again pressed the "menu" button, since the menu creation section 126 stops transmitting the menu image data, the menu image disappears from the image display section 112, and only the image at the brightness specified by the user is displayed.

The operations of the television receiver 100 and the image processing device 200 when the image processing device 200 has been activated are described below. The television receiver 100 and the image processing device 200 operate in the same manner as in the first embodiment when the user has pressed the channel button of the television remote controller 300. Therefore, description thereof is omitted.

Since the image processing device 200 has been activated, a high-quality image is displayed on the image display section 112. When the user has pressed the "menu" button of the television remote controller 300 in this state, the remote control signal including the data code indicating the "menu" button is transmitted from the television remote controller 300. When the remote control signal reception section 102 of the television receiver 100 has received the menu signal, the remote control signal reception section 102 amplifies the menu signal, extracts the data code, and transmits the extracted data code to the data code transmission section 122. Since the image processing device 200 has been activated, the detection section 114 has detected activation of the image processing device 200 and transmitted the detection signal to the data code transmission section 122. Since the data code transmission section 122 has received the detection signal, the data code transmission section 122 transmits the data code indicating the "menu" button to the image processing device 200 through the HDMI interface section 116.

The image processing device 200 receives the data code through the HDMI interface section 208, and transmits the data code to the channel information creation section 214 and the menu control section 210.

Since the data code transmitted from the data code transmission section 122 is the data code indicating the "menu" button, the menu control section 210 generates the control signal for causing the menu creation section 212 to create the menu image data, and transmits the menu image data to the menu creation section 212, as described above. The menu creation section 212 creates the menu image data according to the menu control signal, superimposes the menu image data on the high-quality image data transmitted from the high-quality image processing section 206, and transmits the resulting image data to the television receiver 100 through the HDMI interface section 208.

The television receiver 100 receives the high-quality image data on which the menu image data is superimposed through the HDMI interface section 116, and transmits the high-quality image data to the display image switch section 120. Since the detection section 114 has detected activation of the image processing device 200 and transmitted the detection signal to the switch control section 118, the display image switch section 120 has been controlled by the switch control section 118 so that the display image switch section 120 transmits the high-quality image data to the image display section 112. Therefore, the display image switch section 120 transmits the high-quality image data on which the menu image data is superimposed to the image display section 112. The image display section 112 superimposes the image expressed by the menu image data on the image expressed by the high-quality image data, and displays the resulting image.

When the user has selected the item "clearness" by operating the "↑" and "↓" buttons and the "select" button and then pressed the "↑" button, the menu creation section 126 creates the menu image data which changes the display of the level gauge, and superimposes the menu image data on the high-quality image data transmitted from the high-quality image processing section 206. The menu creation section 126 also transmits the image quality adjustment information corresponding to the resolution and solidity indicated by the level gauge to the high-quality image processing section 206. The high-quality image processing section 206 adjusts the resolution and solidity based on the image quality adjustment information transmitted from the menu creation section 212 when subjecting the image signal transmitted from the tuner unit 204 to the high-quality image processing. Therefore, an image with the resolution and solidity specified by the user and the "clearness" level gauge are displayed on the image display section 112.

When the user has again pressed the "menu" button, since the menu creation section 212 stops transmitting the menu image data, the menu image disappears from the image display section 112, and only the image with the resolution and solidity specified by the user is displayed.

According to this embodiment, the image quality of the television receiver 100 and the image processing device 200 can be adjusted using the television remote controller 300 attached to the television receiver 100, as described above. This makes it unnecessary for the user to selectively use a dedicated remote controller of the image processing device 200 and the television remote controller 300 of the television receiver 100.

The menu image of the image processing section 110 of the television receiver 100 is displayed on the image display section 112 when the image processing device 200 is not activated, and is automatically changed to the menu image of the high-quality image processing section 206 of the image processing device 200 after the image processing device 200 has been activated. Therefore, the image quality of the image processing device 200 can be adjusted while checking the image displayed on the image display section 112.

In this embodiment, the data code transmission section 122 switches the data code transmission destination depending on whether or not the data code transmission section 122 has received the detection signal from the detection section 114. Note that the data code transmission section 122 may transmit the data code to all of the channel information creation section 104, the menu control section 124, and the image processing device 200, for example.

Modification

The effects obtained by the television receivers 100 according to the first to third embodiments may also be obtained by using various devices having an image display function such as a liquid crystal display or a CRT display and a tuner unit. For example, the television receiver may be a personal computer, a set-top box, a VCR, or the like.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A high-quality image display system comprising:
an image processing device; and
a television receiver to which the image processing device can be connected through a predetermined communication channel,
wherein the television receiver includes:
an operation signal reception section which receives an operation signal transmitted from a remote control section;
a first tuner unit which receives television broadcasting on a desired channel based on indication information obtained from the operation signal and acquires an image signal corresponding to the broadcasting;
an image processing section which subjects the image signal acquired by the first tuner unit to predetermined image processing and outputs the processed image signal;
an image display section which displays an image based on the image signal output from the image processing section;
a first communication channel interface section which transfers information between the television receiver and the image processing device when the image processing device has been connected to the television receiver through the communication channel;
an image processing device detection section which detects whether or not the image processing device connected to the television receiver is in operation, through the first communication channel interface section and outputs the detection result;
an indication information transmission section which transmits the indication information obtained from the operation signal to the image processing device instead of the first tuner unit through the first communication channel interface section, based on the detection result when the image processing device is in operation; and
a display image switch section which supplies a high-quality image signal from the image processing device, instead of the image signal from the image processing section, through the first communication channel interface section to the image display section, based on the detection result when the image processing device is in operation, the display image switch section then causing the image display section to display a high-quality image based on the high-quality image signal, and wherein the image processing device includes:

a second communication channel interface section which transfers information between the image processing device and the television receiver when the image processing device has been connected to the television receiver through the communication channel;

a second tuner unit which receives television broadcasting on a desired channel based on the indication information when the indication information has been input from the television receiver through the second communication channel interface section and acquires an image signal corresponding to the broadcasting; and a high-quality image processing section which subjects the image signal acquired by the second tuner unit to predetermined high-quality image processing and transmits the processed image signal to the television receiver through the second communication channel interface section as the high-quality image signal.

* * * * *